(No Model.) 2 Sheets—Sheet 1.
A. JAMESON.
BICYCLE.
No. 565,542. Patented Aug. 11, 1896.
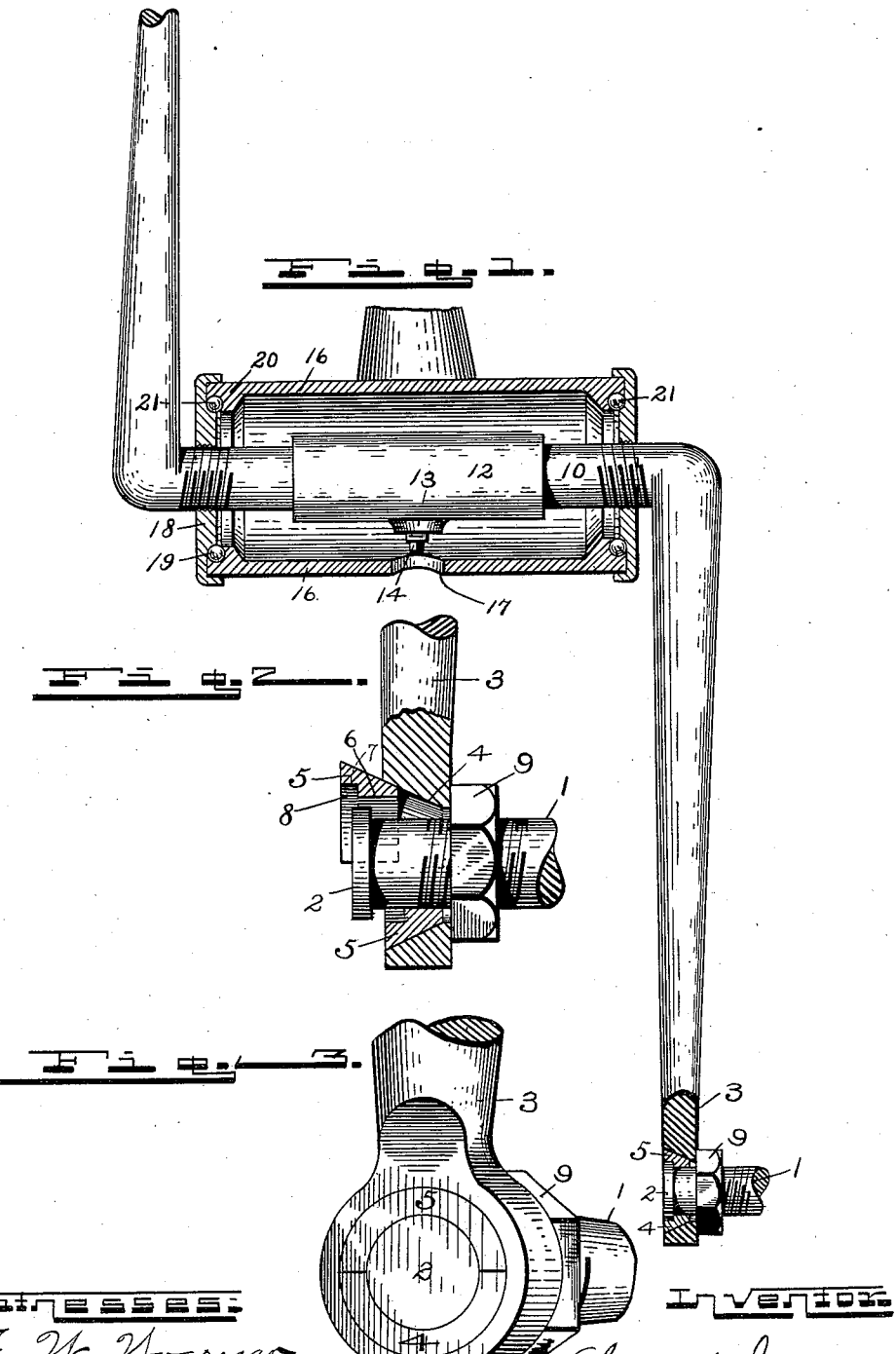
Witnesses:
F. W. Woerner
Jula Green
Inventor:
Alexander Jameson
By V. H. Lockwood
ATTORNEY.

(No Model.)  2 Sheets—Sheet 2.
A. JAMESON.
BICYCLE.
No. 565,542.  Patented Aug. 11, 1896.
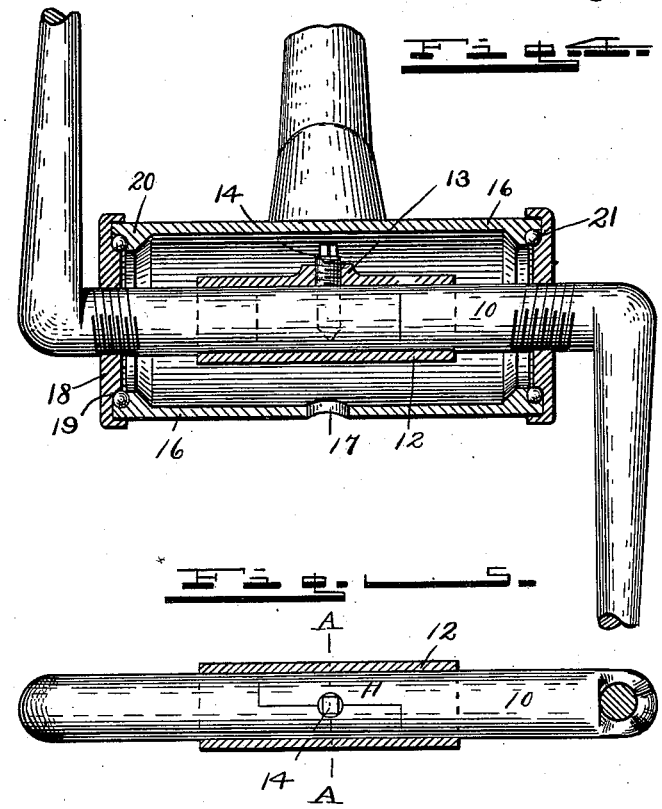
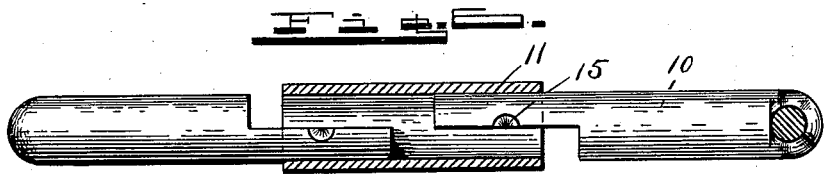
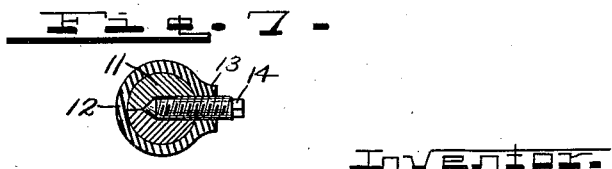

UNITED STATES PATENT OFFICE.

ALEXANDER JAMESON, OF INDIANAPOLIS, INDIANA.

BICYCLE.

SPECIFICATION forming part of Letters Patent No. 565,542, dated August 11, 1896.

Application filed October 30, 1895. Serial No. 567,345. (No model.)

*To all whom it may concern:*

Be it known that I, ALEXANDER JAMESON, of Indianapolis, county of Marion, and State of Indiana, have invented a certain new and useful Improvement in Bicycles; and I do hereby declare that the following is a full, clear, and exact description thereof, reference being had to the accompanying drawings, in which like figures refer to like parts.

My invention relates to means for securing the pedal-shaft to the crank in order to avoid the extension of a head or nut inward toward the machine.

The features of my invention will appear from the description and claim following and the accompanying drawings.

In the drawings, Figure 1 is a plan view of the pedal-cranks connected, with the hanger in section and pedal-shaft broken away. Fig. 2 is a section of the means for securing the pedal-shaft to the crank, the parts being loosened to show how they are united and disconnected. Fig. 3 is a perspective of the union between the pedal-shaft and the crank after it is made. Fig. 4 is a section showing the mounting of the pedal-cranks in the hanger. Fig. 5 is a plan view of the pedal-cranks united, the sleeve being in section. Fig. 6 shows the pedal-cranks in position to unite with the sleeve, which is shown in section. Fig. 7 is a section on line A A of Fig. 5.

I provide the pedal-shaft 1 with the head 2, having a rectangular inner face. In the end of the crank 3, I provide a seat or hole 4 for the pedal-shaft that is to be connected, the small end of the hole being large enough to permit the removal of the head 2, that is on the pedal-shaft 1. I provide a split gasket 5, whose outer periphery is beveled or inclined to fit snugly in the seat 4, and with an inner surface to conform with the head 2 and the pedal-shaft. Thus it is provided with a bore of small diameter at 6 and of large diameter at 7, with a rectangular annular shoulder 8, and fits snugly in the seat for it formed by the union of the head 2 to the pedal-shaft 1. The two parts of these gaskets are semicircular. After placing the pedal-shaft in the position shown in Fig. 2 with relation to the crank, the parts of the split gasket are slipped into the space between the end of the pedal-shaft and its seat. Then the gasket and end of the pedal-shaft are drawn into the conical seat by turning the nut 9 until all of the parts are tightly clamped together, as shown in Figs. 1 and 3. With this arrangement the end of the crank to which the pedal-shaft is connected is flush, as seen in Fig. 3, without any nut or head extending inward. To remove the pedal-shaft, the nut 9 may be loosened and the parts of the gasket removed, as seen in Fig. 2.

The cranks are each integral with a section of the crank-shaft 10. The shaft is split, as seen in Figs. 5 and 6, with the oppositely-posed overlapping ends 11, so that the two parts are in close union, as seen in Fig. 5. At the place of union, they are enveloped with a sleeve 12, provided with a reinforcement 13 and a threaded hole to receive the locking-pin 14. This pin extends through the sleeve and enters the hole formed in the two overlapping parts 11 of the crank-shaft by means of the corresponding grooves 15. When the two parts of the shaft are united, the locking-pin 14 is screwed into place, extending into such hole or seat in the crank-shaft, and holds the two parts firmly together, so that they cannot escape from each other and the sleeve 12. This union is made after the parts of the crank-shaft are placed within the hanger 16. The hanger 16 is provided with a hole at 11, through which the locking-pin may be reached and operated.

Screwed on the crank-shaft are caps 18, provided with shoulders 19, which coöperate with corresponding shoulders 20 on the hanger to form an annular chamber that is filled with balls to form a suitable ball-bearing. This construction enables one to remove his crank from the hanger by merely removing the locking-pin 14. In joining two parts of the crank-shaft, the sleeve is first slipped over one end and extended into the hanger, then the other end of the shaft is slipped into the sleeve until the two parts of the shaft fit together, as in Fig. 5, whereupon the locking-pin is inserted. This construction is very simple, strong, durable, and easily manipulated.

What I claim as my invention, and desire to secure by Letters Patent, is—

In a bicycle, the combination of a pedal-shaft with a head on one end, a crank with a beveled seat to receive the headed end of the pedal-shaft, a split gasket that fits in the beveled seat of the crank and envelops the pedal-shaft having an inner shoulder to bear against the inner face of the head on the pedal-shaft, and a nut that screws on the pedal-shaft to hold the parts securely together.

In witness whereof I have hereunto set my hand this 19th day of October, 1895.

ALEXANDER JAMESON.

Witnesses:
V. H. LOCKWOOD,
ZULA GREEN.